(12) United States Patent
De Winter et al.

(10) Patent No.: US 10,973,250 B2
(45) Date of Patent: Apr. 13, 2021

(54) METHOD FOR PREPARING A POTATO PRODUCT FOR FINISH-FRYING, PROCESSING LINE THEREFOR AND SUCH A POTATO PRODUCT FOR FINISH-FRYING

(71) Applicant: FRIES4ALL B.V., Joure (NL)

(72) Inventors: Leon De Winter, Bloemendaal (NL); Leon Eijsman, Blaricum (NL); Johannes Elisabert Van Doorn, Grootebroek (NL)

(73) Assignee: FRIES4ALL B.V., Joure (NL)

( * ) Notice: Subject to any disclaimer, the term of this patent is extended or adjusted under 35 U.S.C. 154(b) by 189 days.

(21) Appl. No.: 15/560,888

(22) PCT Filed: Mar. 23, 2016

(86) PCT No.: PCT/NL2016/050201
§ 371 (c)(1),
(2) Date: Sep. 22, 2017

(87) PCT Pub. No.: WO2016/153349
PCT Pub. Date: Sep. 29, 2016

(65) Prior Publication Data
US 2018/0116264 A1    May 3, 2018

(30) Foreign Application Priority Data

Mar. 23, 2015 (NL) .................................. 2014505
Mar. 8, 2016 (NL) .................................. 2016397

(51) Int. Cl.
*A23L 19/18* (2016.01)
*A23L 29/212* (2016.01)
(Continued)

(52) U.S. Cl.
CPC ............... *A23L 19/18* (2016.08); *A23L 5/10* (2016.08); *A23L 5/11* (2016.08); *A23L 29/212* (2016.08);
(Continued)

(58) Field of Classification Search
None
See application file for complete search history.

(56) References Cited

U.S. PATENT DOCUMENTS 4,254,153 A * 3/1981 Ross .................. A23L 19/18
426/438
4,542,030 A * 9/1985 Haury ................ A23L 19/18
426/262
(Continued)

FOREIGN PATENT DOCUMENTS

EP      0935927 A2    8/1999
EP      2823716 A1    1/2015
(Continued)

OTHER PUBLICATIONS

Schuten: Effect of frying conditions on the fat content of French fries; published Jan. 29, 2004. (Year: 2004).*
(Continued)

*Primary Examiner* — Patricia A George
(74) *Attorney, Agent, or Firm* — The Webb Law Firm

(57) ABSTRACT

The present invention relates to a method for preparing a potato product for finish-frying, a processing line therefor and a potato product for finish-frying. The method according to the invention includes the steps of: —supplying a quantity of potatoes of a potato variety with an underwater weight equal to or lower than 300 g/5 kg; —washing, peeling and cutting the supplied potatoes to form a basic potato product; —blanching the basic potato product to form a blanched potato product; —drying the blanched potato product; —ap-
(Continued)

plying a coating to the blanched and dried potato product to form a coated potato product; and —pre-frying the coated potato product to form a pre-fried potato product, wherein the steps provide a potato product, the energetic value of which is lower than 190 kCal/100 g after finish-frying.

18 Claims, 2 Drawing Sheets

(51) Int. Cl.
  *A23L 29/219* (2016.01)
  *A23P 20/10* (2016.01)
  *A47J 37/06* (2006.01)
  *A23L 5/10* (2016.01)
  *A23P 20/12* (2016.01)
  *A23N 12/06* (2006.01)

(52) U.S. Cl.
  CPC ............ *A23L 29/219* (2016.08); *A23N 12/06* (2013.01); *A23P 20/10* (2016.08); *A23P 20/105* (2016.08); *A23P 20/12* (2016.08); *A47J 37/0641* (2013.01); *A23V 2002/00* (2013.01)

(56) References Cited

U.S. PATENT DOCUMENTS

| | | | |
|---|---|---|---|
| 5,997,918 A | 12/1999 | Melvej | |
| 5,997,938 A * | 12/1999 | Taylor | A23L 19/18 426/637 |
| 6,274,184 B1 | 8/2001 | Bosch et al. | |
| 2001/0055637 A1* | 12/2001 | Scavone | A23P 20/12 426/94 |
| 2002/0001663 A1 | 1/2002 | Scavone et al. | |
| 2004/0028784 A1* | 2/2004 | Van Beirendonck | A23P 20/12 426/273 |
| 2010/0080872 A1 | 4/2010 | Collinge | |
| 2016/0150810 A1 | 6/2016 | Hume et al. | |

FOREIGN PATENT DOCUMENTS

| | | |
|---|---|---|
| WO | 0008953 A1 | 2/2000 |
| WO | 0028828 A1 | 5/2000 |
| WO | 2014197950 A1 | 12/2014 |

OTHER PUBLICATIONS

Shinzai: Battered French Fries; published online at least by Oct. 1, 2011 based on the reviews, at: https://www.foodnetwork.com/recipes/bobby-flay/grilled-yukon-gold-steak-fries-with-chile-cheese-sauce-recipe-1957600#reviewsTop (Year: 2011).*
Flay: Grilled Yukon Gold Steak Fries with Chile-Cheese Sauce; published at least by Jul. 4, 2011 based on the review of 3026 days ago at: https://www.foodnetwork.com/recipes/bobby-flay/grilled-yukon-gold-steak-fries-with-chile-cheese-sauce-recipe-1957600#reviewsTop (Year: 2011).*
Collinge: WO/2000/028828; published: May 25, 2000 (Year: 2000).*
Bosch: EP 0935927 A2; published Aug. 18, 1999. (Year: 1999).*
Simmonds: Relations between specific gravity, dry matter content and starch content of potatoes; published: Potato Res. 20 (1977) 137-140 (Year: 1977).*
Good: How to Cook Raw Potatoes in Minutes to Make French Fries; published online at least by Apr. 6, 2012 at evidenced by: https://web.archive.org/web/20120406100315/https://www.livestrong.com/article/467711-how-to-cook-raw-potatoes-in-minutes-to-make-french-fries/ (Year: 2012).*
Muller et al.; "Die Ermittlung des Starke-und Trockensubstanzgehaltes in Kartoffelknollen nach Bestinmung des Unterwassergewichtes an Hand modifizierter Tabellenwerte*"; Starke, 1978; pp. 12-20; :http://onlinelibrary.wiley.com/store/10.1002/star.19780300105/asset/19780300105_ftp.pdf?v=1&t=ib0f2itg&s=339fb463f33c144b31301352924b8f55b2272013; English Abstract.

* cited by examiner

METHOD FOR PREPARING A POTATO PRODUCT FOR FINISH-FRYING, PROCESSING LINE THEREFOR AND SUCH A POTATO PRODUCT FOR FINISH-FRYING

CROSS-REFERENCE TO RELATED APPLICATIONS

This application is the United States national phase of International Application No. PCT/NL2016/050201 filed Mar. 23, 2016, and claims priority to Dutch Patent Application Nos. 2014505 and 2016397 filed Mar. 23, 2015 and Mar. 8, 2016, respectively, the disclosures of which are hereby incorporated in their entirety by reference.

BACKGROUND OF THE INVENTION

Field of the Invention

The present invention relates to a method for preparing a potato product for finish-frying, such as french fries or other forms of granulates or starch compositions. Such french fries as exemplary product relate particularly to french fries which can be or are deep-frozen and which are finish-fried at a later stage. In an alternative process the french fries are fresh fries which are finish-fried directly or from a refrigerator.

Description of Related Art

Potato products, in particular french fries, are produced and consumed in large quantities worldwide. These products are usually rich in (available) carbohydrates and fats and are also high-calory, i.e. have a high energy content/high energetic value. Consumption of large quantities can certainly contribute toward an unhealthy lifestyle of a consumer, which can result in medical and other problems.

The present invention has for its object to provide a method for preparing a potato product for finish-frying with which a potato product, in particular french fries, can be realized with preferably a relatively low content of (available) carbohydrates and preferably low fat content and a relatively low energetic value and which is also perceived by the consumer as being a tasty product of good quality in respect of, among other qualities, crunchiness, bite, mouthfeel, colour, flavour and the like.

SUMMARY OF THE INVENTION

This object is achieved with the method for preparing a potato product for finish-frying according to the present invention, wherein the method comprises the steps of:
 supplying a quantity of potatoes of a potato variety with an underwater weight equal to or lower than 300 g/5 kg;
 washing, peeling and cutting the supplied potatoes to form a basic potato product;
 blanching the basic potato product to form a blanched potato product;
 drying the blanched potato product;
 applying a coating to the blanched and dried potato product to form a coated potato product; and
 pre-frying the coated potato product to form a pre-fried potato product, wherein the steps provide a potato product, the energetic value of which is lower than 190 kCal/100 g after finish-frying.

The method according to the invention prepares a potato product, in particular french fries, which is pre-fried and which is to be finish-fried. Other potato products which are finish-fried can however also be prepared with the same method. It is possible here to envisage other potato starch or granulate products. These products can be prepared with the method according to the present invention. The method will be elucidated in more detail hereinbelow with french fries as exemplary product.

In the preparation process according to a currently preferred embodiment the successive steps apply of: peeling>cutting of french fries>washing>optionally selecting products>washing>blanching>drying>coating>blast freezing>storage at −20° C.>finish-frying.

The method according to invention comprises a number of steps such as washing, peeling and cutting the (selected) potatoes to form a basic potato product which can then be blanched. After blanching and drying a coating is applied to the blanched potato product in a coating process, which is also referred to in the context of the present invention as a pre-frying process. A further protection of the potato product is hereby provided against inter alia absorption of oil and for the purpose of retaining moisture in the product. Together with the coating, the coated potato product is pre-fried. According to the invention the properties of the coating are preferably adapted here to the properties of the specific potato product in order to counteract, among others, absorption of fat and relinquishment of water during pre-frying. Following pre-frying of the coated potato product, the potato product in the form of fresh french fries can be immediately finish-fried for consumption, can be cooled or, according to a currently preferred embodiment, deep-frozen for further transport and sale, wherein the pre-fried potato product is finish-fried at a later stage. Deep-freezing can be performed in accordance with diverse time-temperature relations.

Making use of potatoes with an underwater weight equal to or lower than 300 g/5 kg (corresponding to 16.8% dry substance and specific weight of 1.063) achieves that an end product can be provided which has a relatively low energy content/energetic value. Many potatoes have an underwater weight lying in the range of 325-450 g, corresponding to a dry substance content of about 17-24%. Use is made in practice of an underwater weight of 380-420 g for the processing of potatoes for french fries, although a lower limit of 360 g is also applied. A lower underwater weight usually causes the problem that insufficient water is evaporated during the treatment process, whereby the french fries are relatively wet and limp. At a higher underwater weight the french fries become too hard and too dry. The stated range of about 380-420 g is therefore strictly adhered to in practice.

By making use according to the invention of potatoes with an underwater weight equal to or lower than 300 g/5 kg a pre-fried potato product is obtained with the method according to the invention which, after finish-frying, results in a product with an energetic value lower than 190 kCal/100 g. The potato product obtained with the method according to the invention is for this purpose preferably finish-fried in a further step, optionally after being deep-frozen. This finish-frying preferably takes place in an air fryer. The stated energetic value is hereby realized. By way of comparison, conventional portions of so-called small french fries have after finish-frying a calorific content per 100 g in the range of for instance 300-310 kCal and a carbohydrate content per 100 g of about 38 to 42 g. Said values apply for a cut size of about 6 mm. Similar values also apply for other conventional portions of french fries obtainable at fast-food restaurants and the like. It is noted that a different energetic value of the end product is obtainable by modifying for instance the cut size of the product. A larger cut size thus has a relatively lower energetic content than a smaller cut size. The above stated values therefore make possible a comparison particularly of said small french fries prepared in conventional manner and with the method according to the invention.

The underwater weight of the potatoes as starting material is lower than 300 g/5 kg according to the invention. This corresponds to 16.8% dry substance or less. The underwater weight is preferably higher than about 225 g/5 kg (about 13% dry substance), the underwater weight more preferably lies in the range of 245-285 g/5 kg. This corresponds to 14-16% dry substance. It is found that the method according to the invention realizes a good product using such starting material.

The method according to the invention can be applied to diverse shapes and cut sizes of the end product. Cut sizes of 10×10 mm and 12×12 mm are for instance applied. Other cut sizes and shapes are also possible according to the invention.

In a currently preferred embodiment the pre-fried potato product is finish-fried with hot air, preferably in an air fryer. The energetic value of the product usually increases during finish-frying. This finish-frying can take place with a fresh, refrigerated potato product as well as with a deep-frozen pre-fried potato product. After finish-frying an end product is obtained here with an energetic value lower than 190 kCal/100 g. With such an upper limit a significant reduction is therefore achieved in the energetic value of the end product, in particular french fries. This results in a healthier end product, whereby the adverse effect which conventional french fries can have on a consumer is counteracted or can even be wholly obviated. This will of course also depend on the fitness and lifestyle of the consumer. The reduction in calories does however make the final end product, such as french fries, healthier, whereby consumption of an equivalent quantity reduces the risks of (medical) problems as associated with the excessive consumption of conventional products as currently available at fast-food restaurants.

By making use of potatoes of a low-carbohydrate variety with an underwater weight equal to or lower than 300 g/5 kg, this completely at variance with current guidelines and current practice, a finish-fried potato product can be provided with the method according to the invention with an energetic value which is relatively low. This results in a clear improvement for consumers of the finish-fried potato product, in particular french fries, in respect of health, use in combination with diets and in other ways.

It has even also been found that even greater reductions in energetic values of the potato product are possible with the method according to the invention. The energetic value of the finish-fried potato product prepared with the method according to the invention is preferably lower after finish-frying than 180 kCal/100 g, and preferably even lower than 170 kCal/100 g, and more preferably even lower than 160 kCal/100 g. It has been found that this further reduction can be realized according to the invention. It has even been found that it is possible with the method to realize an energetic value lower than 150 kCal/100 g. A further reduction in the energetic value of the potato product, in particular french fries, is hereby achieved, thereby further enhancing the above stated effects.

It is also found that the content of available carbohydrates in the finish-fried potato product can be significantly reduced by applying the method according to the present invention. In the context of the description of the invention carbohydrates are specifically understood to mean available carbohydrates, also referred to as digestible carbohydrates, which contribute toward the calorific values via the digestive system. The carbohydrate content in the finish-fried potato product thus amounts to lower than 29% by weight relative to the total weight, more preferably lower than 28% by weight, still more preferably lower than 26% by weight, and most preferably lower than 24% by weight. After pre-frying the carbohydrate content is even slightly lower, for instance lower than 22% by weight.

By reducing the quantity of carbohydrates in the end product the adverse effect conventional french fries can have on a consumer is counteracted still further than already described above in respect of the reduction in energetic value. A further additional advantage of the potato product prepared with the method according to the invention is that it also becomes more readily suitable for a larger group of consumers with diverse diets or dietary requirements.

It has been found that the end product obtained with the method according to the invention is perceived to be a good quality product in respect of, among other qualities, crunchiness, bite, mouthfeel, colour, flavour, crispness and the like. Experiments and measurements also demonstrate that a good quality product is obtained with the method according to the invention, for instance by performing crispness measurements.

It has also been found that with the method according to the invention the acrylamide content in the finish-fried potato product can be significantly reduced to values lower than 120 μg/kg, more preferably lower than 100 μg/kg, and still more preferably lower than 75 μg/kg, and most preferably lower than 60 μg/kg. Following the pre-frying in the method according to the invention the acrylamide content is even more significantly lower, for instance lower than 30 μg/kg. Potato varieties with a low underwater weight, for instance equal to or lower than 300 g/5 kg, with a high reducing-sugar content, for instance up to 1200 mg/100 g, display an enormous buildup in acrylamide during the treatment process to obtain a finish-fried potato product. Any discussion on possible harmful effects of acrylamide for consumers is at the very least avoided by providing a finish-fried coated end product with a lower acrylamide content.

In an advantageous preferred embodiment according to the present invention the blanching time lies in the range of 8 to 12 minutes, preferably in the range of 9 to 11 minutes, and most preferably amounts to about 10 minutes. In a currently preferred embodiment the blanching temperature lies in the range of 74 to 84° C., preferably lies in the range of 76 to 83° C. and is most preferably in the range of 78 to 82° C. It has been found that with said temperatures and time periods, preferably in combination, the suitable potato product is obtained.

In an advantageous preferred embodiment according to the present invention the most suitable drying conditions are a combination of a drying time in the range of 8-12 minutes and preferably a drying time of 10 minutes, and a drying temperature in the range of 70-90° C. and preferably a drying temperature of 80° C. The combination of 10 minutes and 80° C. is found to be particularly suitable, particularly in combination with the above discussed blanching conditions.

In a further advantageous preferred embodiment according to the invention the coating step is performed at a temperature of about 160° C. and the coating is applied in the form of a pre-frying process within a time interval in the range of 1.5 to 2.5 minutes. It is found that with said temperatures and time intervals, preferably in combination, the suitable potato product is obtained.

Use is optionally made of a so-called vacuum fryer, wherein a temperature is applied in the range of 120-150° C., preferably about 130° C. Such a fryer can be applied as alternative according to invention.

The finish-frying time further preferably lies in the range of 6 to 9 minutes, preferably in the range of 7 to 8 minutes. It is found that the suitable potato product is obtained with said temperatures and time periods, preferably in combination. The finish-frying conditions are preferably applied in combination with said blanching conditions. Although finish-frying and preparatory steps, including blanching and pre-frying, are separate (sub-)processes, these steps do have an influence on the product and on the most suitable conditions. It is found that applying such conditions results in a desired product.

The effect of said drying and blanching conditions and finish-frying conditions is further described in the discussion of several experiments. These show that these conditions surprisingly result in a potato product with desired properties.

In an advantageous preferred embodiment according to the present invention the coating is provided with a composition comprising by weight, relative to the weight of the composition:
  30-60% modified starch comprising high-amylose starch;
  20-30% flour;
  5-20% dextrin;
  2-10% unmodified starch; and
  0.01-2% carbonate.

The composition for the coating is applied as suspension to a blanched and dried potato product by dipping, spraying, atomizing or other suitable manner of applying the coating, wherein it is adhered to or on the potato product with a deep-frying step (pre-frying). The specific composition according to the invention interacts with the product and forms thereon a protective layer distributed as uniformly as possible, resulting in the most optimal possible end product after the performing of further processing steps, including finish-frying and, in a currently preferred embodiment, for instance deep-freezing. In the treatment process according to the invention an intermediate product is therefore provided with the coating according to the invention so as to thereby improve the final end product for the consumer. It is found that the coating can be applied in substantially calory-neutral manner. This is caused by retaining moisture present in the product during finish-frying, preferably in an air fryer.

Such a specific approach, wherein the coating according to the invention is applied to an already processed/blanched and dried product on which other final processing(s) are performed, including for instance blowing-off for the purpose of removing excess coating, and finish-frying (for instance with hot air or otherwise), optionally preceded by deep-freezing and transporting of the product, requires a good interaction between the individual components of the composition. This is achieved with the specific composition according to the invention.

The modified starch according to the composition, for instance from potato, corn and/or tapioca, provides for a desired hardness, airiness and crispness of the crust of the potato product to which the coating is applied. The modified starch content is in addition important for adhesion of the coating to the potato product and the transparency of the coating, so that it acquires the desired white, light yellow to golden yellow colour during processing, whereby it becomes attractive for consumption. The modified starch comprises high-amylose starch. This high-amylose starch is a starch with at least a content of about 60% amylose. It has been found that in a currently preferred embodiment according to the invention a quantity of modified starch in the range of 30-50% yields particularly good results for the end product with a dextrin content preferably in the range of 5-20%. In the currently preferred embodiment the dextrin also comes from a supplied product Crystal Tex 644, in this embodiment from tapioca. In another embodiment potato is the source. The above stated effects are hereby enhanced still further, particularly in combination with said modified starch, preferably a combination of potato starch and corn starch and/or tapioca. The unmodified, preferably high-amylose starch preferably comes from corn. It has been found that said combination of raw materials provides the enumerated properties.

In addition to being a filler, the quantity of flour also has a positive effect on the adhesion and the crispness, so that the effect of the modified starch is hereby further enhanced in respect of these aspects. The flour is for instance derived from rice and/or corn. It is found here that particularly flour from rice enhances the stated effects.

The unmodified starch, for instance from corn, has in addition to an adhesive action also a stabilizing effect, and a so-called 'gelling' effect for the coating. It has been found that the ratio of modified starch and unmodified starch is of great importance here for the final result of the potato product after the finish-frying process. This result relates to, among other factors, the extent to which the interior, or filling, of the potato product is cooked and its texture and structure, the crispness/crunchiness of particularly the crust of the potato product, and the desired golden yellow colour of the finish-fried end product. The relation between crispness of the crust and the soft texture/structure of the filling is relevant here.

It has been found particularly that the use of the above described coating in the described method, preferably with potatoes of said varieties, results in a low-calory potato product with the following properties following finish-frying thereof, preferably in an air fryer, of:
  calorific value lower than 190 kCal/100 g;
  content of available carbohydrates 20-24%;
  acrylamide lower than 100 µg/kg;
  colour in accordance with USDA≤3;
  fat content in the range of 5-7%;
  texture 1.5-2.5 Newton; and
  shelf life of 5 minutes during holding time at about 60° C. under a heating lamp.

The specific coating composition according to the invention has been found particularly suitable for use with (low-carbohydrate) potato varieties with a relatively low underwater weight equal to or lower than 300 g/5 kg as starting material for the potato product. Such low-carbohydrate potatoes, including for instance the potato varieties Colomba and Carrera, are usually used in practice for boiling and frying processes other than deep-frying. Deep-frying of potato products from these potato varieties results in a conventional frying process in (very) limp french fries with a very considerable brown discoloration and high content of acrylamide. It has been found that the coating in accordance with the composition according to the invention is extremely suitable for these low-carbohydrate potato varieties in particular and results in an end product, particularly french fries and optionally also other potato products, with the desired properties in respect of crispness, hardness, extent to which it is cooked, colour and the like. By using potato varieties with a low underwater weight in interaction with the coating with the composition according to the invention, whereby absorption of (deep-frying) oil is for instance counteracted, the end product is relatively low-calory and low-carbohydrate. It has been found that said aspects can be improved still further by being applied in combination with the air frying further elucidated in this description.

It is found that, by applying the coating with the composition according to the invention, a reduction in energy content (in kCal) of more than 20%, even more than 25%, and under certain conditions even about 50%, is possible compared to french fries as currently prepared by known fast-food restaurants. This means a significant reduction in energy content of the end product. A further effect of the coating composition according to the invention is the significant reduction in the quantity of carbohydrates in the end product. Conventional french fries as prepared in fast-food restaurants typically have a content of about 40% by weight of carbohydrates. The end product with the coating of the composition according to the invention has a lower carbohydrate content. An end product of a low-calory potato provided with the coating according to the invention thus has a content of less than 35%, even less than 30% and even as much as less than 25%. This means a significant reduction in carbohydrate content of the end product. It is also found that a reduction in fat content can be realized.

The modified starch preferably comprises chemically acetylated starch, wherein the chemically acetylated starch preferably comprises 10-25% of the total content of modified starch. The content of phosphorylated starch amounts to 75-90% of the modified starch. It has been found that herewith, and in particular the stated mixing ratio, the above stated effects are further enhanced A possible supplied product for this modified starch is Crisp Film.

The composition according to the present invention preferably further comprises a percentage by weight of 0.01-1% of thickener, preferably a percentage by weight of 0.01-0.5%. The thickener increases the stability of the coating, particularly during the further treatment process. This is particularly relevant when the coating is applied to a pre-processed product which still has to undergo diverse finishing processes, as is particularly the case with french fries. Using the thickener the effect of the coating according to the invention is therefore preserved during the further treatment processes.

The thickener preferably comprises xanthan. It has been found that xanthan works particularly effectively and makes a significant contribution toward the stability of the coating, particularly during the treatment process.

In a currently preferred embodiment according to the present invention the percentage by weight of bicarbonate, for instance potassium bicarbonate and/or sodium bicarbonate, lies in the range of 0.01-1%, preferably in the range of 0.01-0.5% and most preferably in the range of 0.01-0.1% by weight. The crispness of the outer side of the end product is further improved by providing a carbonate, preferably added as component of baking powder. A percentage in the range of 0.01-0.1% by weight has been found particularly advantageous here in combination with the other components of the composition according to the invention. When sodium bicarbonate is used in said range (including sodium) there is over 70% of effective bicarbonate substance.

In a further advantageous preferred embodiment according to the present invention the coating composition comprises a percentage by weight of 5-10% of mineral salts. The flavour of the end product and the ionizing effect of the coating are improved by adding mineral salts, in a currently preferred embodiment NaCl and/or KCl. It has even been found possible here to substantially dispense with additional additives to the end product, including salt. The amount of mineral salt in the end product can hereby be precisely adapted to the coating of the composition according to the invention, without further additives to the end product being required. This simplifies the treatment process as well as the process of serving the prepared french fries in a fast-food restaurant, since fewer operations need be performed. In addition, the coating according to the present invention avoids too large a quantity of salt being added after the finish-frying process, so that possible adverse consequences thereof are avoided.

In a currently preferred embodiment it is possible, by applying the coating according to the shown composition in the method according to the invention, to dispense with later addition of salt. In addition to the above stated (production) advantages, this minimizes the intake of salt by a consumer. The flavour of the product is such here that it is perceived by the consumer as being of good quality and not needing additional salt. In an advantageous embodiment of the coating according to the invention it has been found that the salt perception experienced by the consumer is such that no need is felt to later add additional salt, with for instance the risk of overdosing. It has been found that, with the coating according to the invention, the salt intake by the consumer can be reduced to about 25%, or even much more to about 50%, of conventional further salted french fries in a fast-food restaurant.

In a further advantageous preferred embodiment according to the present invention the method comprises of modifying a coating composition on the basis of the origin of the potato product, storage life and/or storage conditions.

It has been found that by modifying the coating composition according to the invention aspects such as origin, storage life and/or storage conditions no longer have a significant influence on the final end product, for instance the french fries, or at least the influence of these aspects can be reduced. It is also possible to make allowance for the influence of seasonal and regional variables which apply during the whole (growth) cycle in the growing process between the different locations in different countries on the quality of the potato product to be made. The ratio of the modified and unmodified starch can for instance thus be varied, preferably within the above stated limits, in order to thereby realize a quality of the obtained end product which is more consistent over time. Additionally or alternatively, process conditions and optionally the amount of coating can also be adapted to one or more of the above stated aspects.

In a further advantageous preferred embodiment according to the invention the pre-fried potato product is deep-frozen prior to the finish-frying.

Deep-freezing of the pre-fried potato product makes transport and storage possible. The deep-frozen pre-fried potato product can thus be taken to for instance the consumer, who finish-fries it at home when desired.

The finish-frying is preferably performed using hot air in an air fryer. By making use of an air fryer no additional fat is in principle added to the product during the finish-frying. It has been found that such a finish-frying process in combination with the method according to the invention further enhances the stated effects in respect of energetic value, content of carbohydrates and content of acrylamide. It is found that air frying results in a good end product with a relatively low energetic value, low content of carbohydrates and fats, low content of acrylamide, reduced salt intake by the consumer, while a good quality end product is provided in respect of, among other qualities, crunchiness, bite, mouthfeel, colour, flavour and the like. It has also been found here that the use of air frying in combination with the above discussed coating improves the end product still further in respect of the above stated aspects. Experiments and measurements also demonstrate that a good quality product is obtained with the coating in combination with air frying according to the invention. Use can be made here of diverse air frying instruments, for instance from Philips, Tefal and Hifry, and optionally of a hot air oven. Under similar conditions the moisture content in the end product in the case of air frying is found to be higher, under specific conditions about 30-40% dry substance, while in a conventional method about 60% dry substance is obtained in the end product.

Finish-frying with the air fryer preferably takes place at a frying temperature in the range of 160° C. to 240° C., more preferably in the range of 170° C. to 190° C. and most preferably at about 180° C. For a consumer appliance, for instance a Philips "Air fryer", the finish-frying temperature preferably lies in the range of 170° C. to 190° C., and amounts most preferably to about 180° C. For a more industrial instrument, for instance the "Lightfry", the finish-frying temperature preferably lies in the range of 200° C. to 240° C.

In a further advantageous preferred embodiment according to the invention an end product is realized provided with a texture with a breaking value in the range of 1.5 to 3.5 N, preferably 1.5 to 2.5 N.

The texture of the end product is perceived by the consumer as an important quality criterion. Texture is for instance (also) measured using a so-called breaking test, which looks at the exerted force at which french fries break. The samples are prepared here are in the best possible selected process conditions, after which the test is performed. It is found here that, for the potato variety conventionally used for french fries, such as Innovator, after pre-frying for about 4 minutes at about 145° C. and finish-frying for about 3 minutes at about 180° C., a breaking force is measured in the range of 3 to 8 N. A considerable variation is measured here. Use of a potato variety with low underwater weight (equal to or lower than 300 g/5 kg), for instance the Colomba, in the processing conditions suitable for this variety of about 2 minutes pre-frying at about 160° C. and finish-frying for about 8 minutes at about 180° C., gives a breaking force in the range of 1.5 to 3 N. This therefore results in a more uniform texture and hereby contributes toward a higher quality perception by the consumer. The texture comprises here a crispy miter side with a soft, creamy, floury and relatively moist interior. It is found here that the coating as discussed above contributes significantly toward attaining a further uniformity of the french fries with the desired texture.

In a particularly advantageous preferred embodiment according to the invention the method further comprises the step of selecting a batch for the purpose of providing a low-calory potato product for finish-frying, comprising of determining the dry substance content for a batch as a function of frying time.

It has been found surprisingly that the dry substance content as a function of the frying time has a predictive value for the dry substance content of coated low-calory french fries. Particularly the directional coefficient of the curve between the dry substance content in relation to the frying time can be used here as suitable parameter for the selection of batches. Surprisingly, the initial dry substance content of the raw product strips is not predictive. With said test according to the invention it is possible to select batches prior to processing by determining the dry substance content as a function of frying time. This avoids an unsuitable batch being processed, which would result in product loss. This therefore further increases the effectiveness of the production process. This will be further elucidated in the discussion of several experiments. It is optionally also possible to adapt process conditions to the respective selected batch. The obtained quality of the end product can hereby be further improved.

It has surprisingly been further found that the dry substance content as a function of the frying time, and more particularly the directional coefficient of the curve of the dry substance content relative to the frying time, likewise has a predictive value for the dry substance content of finish-fried french fries provided with the coating according to the invention. This further increases the reliability of the selection of batches for processing to finish-friable and/or finish-fried low-calory potato product.

In the assessment of a batch for suitability a value for said directional coefficient is preferably assessed according to the invention during determination of the relation between dry substance content and frying time. A value hereof in the range of 4-6 with as unit the percentage of dry substance per minute of frying time (grams of water per minute) is employed here in order to evaluate whether a batch is suitable for processing. These values apply particularly at a frying temperature of 180° C.

The present invention further also relates to a processing line configured to perform a method as described above.

Such a processing line provides the same effects and advantages as described above for the method.

The present invention further also relates to a potato product for finish-frying prepared with the method as described above.

Such a potato product for finish-frying provides the same effects and advantages as described above for the method. A potato product for finish-frying is particularly french fries but can however also comprise other fresh cut potato products, for instance in the form of segments and slices, or products prepared from granulates or starch. It has been found that the potato product for finish-frying prepared with the method according to the invention results particularly in an end product, for instance french fries, with a considerably lower energetic value, a lower carbohydrate content and a lower acrylamide content.

In an advantageous embodiment according to the invention the coating is applied in percentage by weight of the coating composition relative to the total weight of the potato product as end product in the range of 5-18%, preferably 5-16%, more preferably 10-15%, still more preferably 11-15%, and most preferably 12-14%.

It has been found that the above desired effects are achieved as optimally as possible by applying a coating composition according to the invention in said range, and particularly in the range of 12-14%.

The coating is preferably applied to the potato product in a coating process. The coating is brought here into a solution/suspension with a temperature usually in the range of 5-25° C. This is usually referred to as the batter. With the coating according to the invention the dry substance content preferably lies in the range of 30-55%, preferably in the range of 30-50% and more preferably in the range of 35-45%. The absorption by the product, referred to as the pick-up, preferably lies in the range of 9-18% of the coating suspension, preferably in the range of 10-16%. It has been found here that the ratio of pick-up and dry substance influences colour, kCal, crispness and other qualities of the finish-fried product. It has thus been found that good results are provided with a pick-up in the range of 15-16% and dry substance of about 30% of the batter. Per one percent less pick-up about 2.5% more dry substance is required, up to about 45% dry substance at a pick-up to 10%, in order to thus realize a good result.

Provided in a currently preferred embodiment according to the invention are the supplied potatoes with an underwater weight of a maximum of 300 grams/5 kg and preferably of the potato varieties Colomba, Carrera or Evora. The coating can be applied in similar manner to potatoes of other varieties.

It is known in practice that potatoes with a low calory content or low underwater weight are difficult or impossible to deep-fry in view of the resulting limp french fries and possible brown discoloration which occurs during the frying process. Such potatoes are usually applied at the moment for boiling uses and derived products.

It has been found that applying the method to potatoes of the above-mentioned potato varieties provides a potato product with a relatively low energetic value and in addition a relatively low carbohydrate content and preferably low fat content without undesirable brown discoloration occurring during the frying process. The health of consumers is hereby enhanced, or at least not adversely affected, when the potato products are consumed. Owing to a low carbohydrate content, and given that the product is relatively low-calory, the potato product according to the invention in addition becomes suitable for a number of specific diets, whereby a larger group of consumer products is made available to a group of consumers who (have to) follow such a diet.

BRIEF DESCRIPTION OF THE DRAWING

Further advantages, features and details of the invention are elucidated on the basis of preferred embodiments thereof wherein reference is made to the accompanying drawings, in which.

DETAILED DESCRIPTION OF THE INVENTION

Figure 1:
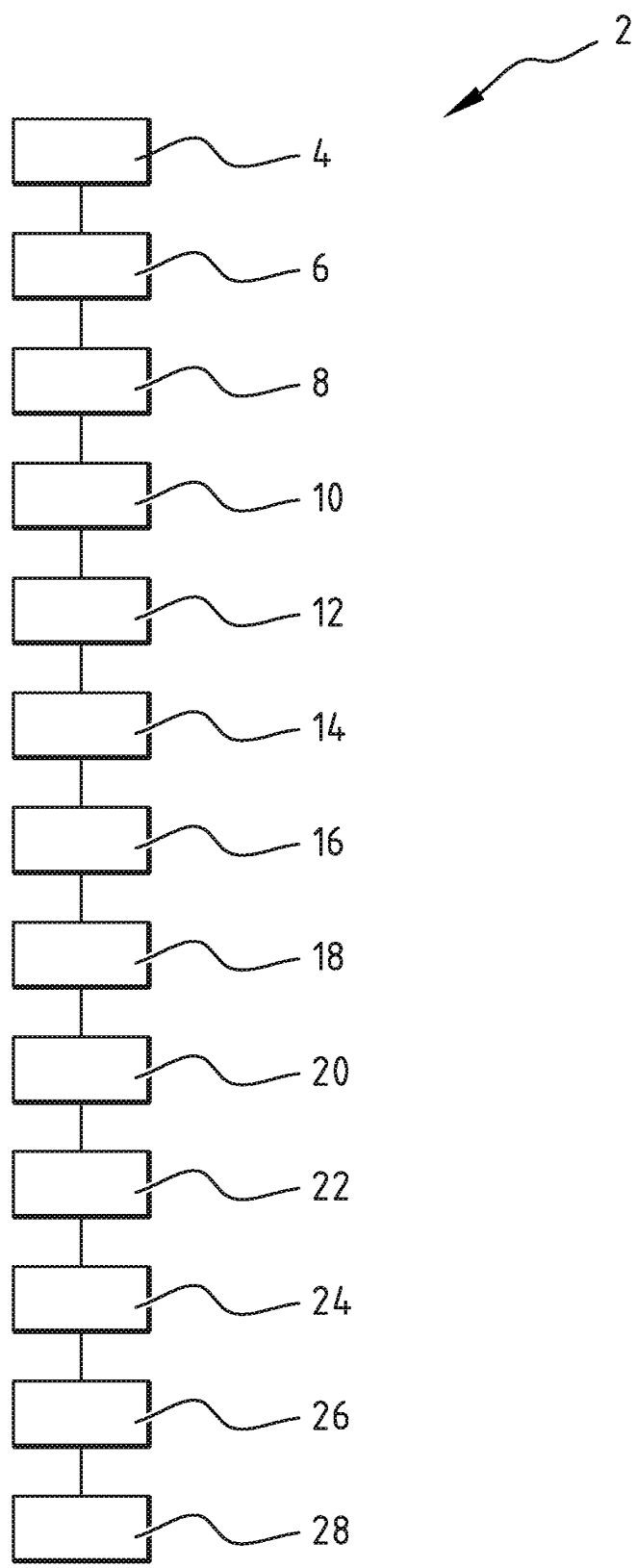
FIG. 1 shows an overview of the process of preparing a potato product.

In treatment process 2 (FIG. 1) following harvesting 4 of the potatoes, the potatoes, following optional selection 6, are optionally stored 8 in a storage location under the best possible storage conditions so as to avoid formation of sugar as far as possible during storage. Once the potatoes have been delivered to the processing location, they are preferably selected 10, washed 12 and usually peeled 14. After peeling, the potatoes are cut 16 into the desired form or otherwise brought into a desired form. After the cutting process there usually follows a blanching process 18 at a temperature of for instance about 80° C. The product is dried and preferably blown dry, wherein excess water is removed from the product and the product is made suitable for optimal adhesion of the coating. After an optional pre-dusting step 20, which is omitted in a currently preferred method, the potato products are provided with the desired coating 22 in a coater using for instance a bath and/or sprayers, and then pre-fried 24. After application of the coating and the pre-frying, the potato products are optionally frozen 26 to form a deep-frozen product or optionally refrigerated and can be finish-fried 28 at a later stage. It is also possible to finish-fry the products immediately in a finish-frying process, preferably by making use of air frying, wherein the finish-frying is performed with hot air. During application of the coating the composition can optionally be varied to some extent depending on product information about the starting material.

Some experimental results will be discussed below wherein french fries produced with the coating according to the invention are compared to conventional french fries from a fast-food restaurant. The conventional values for so-called small french fries are given per 100 grams in Table 1.

TABLE 1

| Conventional Small French Fries (per 100 g) | |
|---|---|
| Calories (kCal) | 307 |
| Carbohydrates (g) | 40 |

Oven fries have an energetic value per 100 grams of about 302 kCal and a carbohydrate content of about 46 grams.

Figure 2A:
FIGS. 2A and 2B show views of products with and without the coating according to the invention.

In the context of the invention the necessary experiments have been performed according to process 2 with a low-calory potato, such as the Colomba, which is deep-fried (fresh) in usual manner, i.e. without being deep-frozen, and in a first experiment is not provided with a coating. The potato is peeled, cut and blanched at 78° C. for 10 minutes. The product is then pre-fried in oil for about 2-4 minutes at about 145° C. and finish-fried in oil for about 3 minutes at 180° C. It will be apparent that variations in said times and temperatures are possible according to the invention, for instance blanching at said relatively high temperature for said period of time. Times and conditions applied depend on, among other factors, product, skills and preferences. The end product resulting from the experiment is shown in FIG. 2A, which clearly shows that a very considerable brown discoloration has occurred.

In addition to said brown discoloration in the finish-frying process, the measurements on the end product without coating of the potato variety Colomba show a (very) high acrylamide content of far above 1000 mg/kg. An increase in the energetic value to far above 200 kCal/100 g is obtained due to absorption of fat/oil, while the amount of carbohydrates is relatively low as a result of the use of potatoes of the Colomba variety.

An experiment was subsequently performed wherein the coating as described above was applied and an analysis was performed on the intermediate product. The coating according to the invention as used in experiments comprises for instance about 42.5% modified starch, with additionally about 15% dextrin (tapioca), 7.5% unmodified starch, 26% flour, 0.1% bicarbonate, about 7.5% mineral salt (in particular potassium chloride) and for the rest small parts of thickener and other components. The obtained product shows a low energetic value and a relatively high moisture content. In this experiment a drying step is performed. Drying temperature is preferably about 60-90° C. In the case of the coating use is preferably made here of a pre-frying time of about 2 minutes at about 160° C. Excess coating is removed in a blowing-off step (and optionally reused).

The intermediate product is then deep-frozen and then finish-fried, wherein water will evaporate and so more solid substance will be formed per 100 g, resulting in an increase in the energetic value relative to the analysis prior to the finish-frying process. A finish-frying process is performed in an air fryer for about 7-8 minutes at a temperature of about 180° C. In this and subsequent experiments use is made in the relevant cases of a Philips "Air fryer". The analysis of the end product, for a cut size of 10×10 mm, is shown in Table 2.

TABLE 2

Analysis of end product with coating (per 100 g, 8 samples of potato variety Colomba)

| Analysis | Unit | Result |
|---|---|---|
| Protein (Kjeldahl, f = 6.25) | % (m/m) | 2.2-2.9 |
| Energetic value (kCal) | kCal/100 g | 149-171 |
| Energetic value (kJ) | kJ/100 g | 626-716 |
| Tot. available carbohydrates | % (m/m) | 21.4-23.9 |
| Fat total (Soxhlet) | % (m/m) | 5.2-6.5 |
| Moisture (Karl Fischer) | % (m/m) | 61.7-66.2 |
| Dietary fibre AOAC 985.29 | % (m/m) | 4.3-6.7 |
| Acrylamide | µg/kg | <50 |

The end product shows a significant reduction in energy content compared to conventional french fries and a great reduction in content of available carbohydrates (measurement Campden BRI, UK). The content of fat and acrylamide is in addition considerably lower than in conventional french fries.

The Carrera variety likewise has a relatively low energetic value, with measurements for the energetic value in the range of 141-176 kCal/100 g, while in a similar determination this is higher for a potato variety conventionally used for french fries, such as Innovator, for instance in the range of 216-229 or even for instance in the range of 216-250 kCal/100 g.

Energetic values realized with the method according to the invention are about 60 kCal/100 g after blanching, about 110 g kCal/100 g for the pre-fried french fries provided with coating, and about 150-170 kCal/100 g after finish-frying. It will be apparent that such values can depend on, among other factors, aspects such as a cut size of the product and other process and preparation parameters.

Figure 2B:
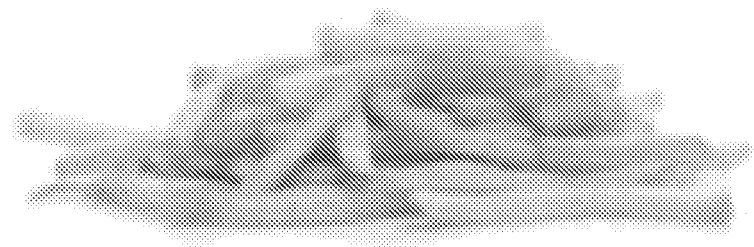

When the coating according to the invention is used in combination with a so-called air frying process, the energetic value per 100 g amounts to about 150-170 kCal, and even lower, and the carbohydrate content to about 21-24% by weight. An enormous reduction in acrylamide is also realized, to clearly below 100 µg/kg. An end product is shown in FIG. 2B. French fries are hereby obtained with a low energetic value and with a low carbohydrate, acrylamide and fat content.

The end product according to the invention has also been compared to conventional french fries in respect of salt content. Conventional french fries in a fast-food restaurant are further salted, resulting in a sodium content of about 0.4-0.8%. This is not yet a case of the salt overdosing which occurs frequently in practice. The experiments with the coating according to the invention have shown that the consumer experiences a taste sensation in the end product such that further salting is unnecessary. The sodium content of the end product according to the invention lies markedly lower (for instance about 0.09-0.14 gram of sodium per 100 grams of non-fried french fries, depending on, among other factors, batter concentration and pick-up). Due to loss of moisture during the finish-frying step this corresponds to about 0.12-0.16% sodium on the end product according to the invention. This means a significant reduction in sodium intake by a consumer per regular portion of french fries.

A number of experiments have also been performed, some results of which are further described below. These demonstrate the effect of the present invention.

Use was made in the experiments of batches of potato varieties with a dry substance content in the range of 14-17% dry substance for making low-calory potato products. Varieties used were Colomba, Carrera and Evora. Products obtained from the experiments were compared to standard potato products with usual calorific value by making use of batches of the potato variety Innovator with a dry substance content of 22-24%.

In the context of the experiment the successive steps in the preparation process were: peeling>cutting of fries>washing>selecting square strips>washing>blanching>drying>coating>blast freezing>storage −20° C.>finish-frying.

The cut size applied amounted to about 10×10 mm, or for several experiments 12×12 mm. The blanching experiments were performed with a batch of potatoes of the Colomba and Carrera varieties with a dry substance content of <16% on the basis of fresh weight as suitable starting material for coated french fries with a calorific value according to the invention. Potatoes with a diameter of 40-70 mm and variable lengths were washed and manually peeled with a paring device prior to the experiments. French fries were cut and, after removal of edge strips, cut french fries had adhering starch removed in a washing step and were stored under water prior to the further experiments. The production of the french fries was performed during all successive steps as a batch process beginning with 500 g of raw french fry strips. Washed french fry strips of both varieties were blanched in a fine-mesh nylon net bag in a water bath in accordance with a time series with incremental time (5, 7.5 and 10 minutes) and a temperature series with incremental temperature (72, 76, 80 and 84° C.) in all possible combinations. The quality of cooking during the blanching process for french fry strips can be determined by the extent to which starch is gelatinized by the heat treatment. This can be determined by breaking strips, pressing the two strip parts against each other at the original position and then slowly pulling them apart. In the case of properly blanched strips starch threads, which have their origin in gelatinized starch, will occur during pulling apart of the two strip parts. Shown in table 3 is the extent to which the french fry strips are cooked at the different time-temperature combinations. The following table 3 shows that 10×10 mm strips of the Colomba and Carrera varieties are properly blanched with a correct degree of cooking in the case of the combinations 10 min-80° C. and 7.5 min-84° C.

TABLE 3

The extent to which the french fries are cooked as a function of different time-temperature treatments measured as the ability to form starch threads when broken strip parts are pulled apart.

| | | temperature in ° C. | | | |
|---|---|---|---|---|---|
| variety | time (min) | 72 | 76 | 80 | 84 |
| Colomba | 5 | uncooked | almost | slightly | somewhat uncooked |
| | 7.5 | almost | slightly | somewhat uncooked | cooked |
| | 10 | slightly | somewhat uncooked | cooked | overcooked |
| Carrera | 5 | uncooked | almost | slightly | somewhat uncooked |
| | 7.5 | almost uncooked | slightly | somewhat uncooked | cooked |
| | 10 | slightly | somewhat uncooked | cooked | overcooked |

Explanatory notes on descriptions used for the extent of cooking:
Uncooked: no starch thread;
almost uncooked: slightly adhering strip parts, no starch thread;
slightly uncooked: adhering strip parts, no starch threads;
somewhat uncooked: adhering strip parts, several starch threads;
cooked: well adhering strip parts, many starch threads;
overcooked: well adhering strip parts, many starch threads, soft tissue structure.

A second reason for blanching is to prevent discoloration of strips during the preparation process. Discoloration of strips as a consequence of enzymatic processes is visible as a red discoloration, usually on the outer ends of the strips. The colour develops quickly after the treatment when the strips are exposed to air. Strips of the sample of the Colomba variety display red discoloration for most time-temperature combinations, with the exception of the combinations 10 min-80° C. and 7.5 and 10 min-84° C. The strips from the Carrera sample display red discoloration for substantially all time-temperature combinations, with the exception of 10 min-80° C. and 10 min-84° C. The deactivation of colour-forming enzymes by a heat treatment is apparently linked to variety and/or batch and takes place optimally in both batches in the case of the 10 min-80° C. treatment in respect of both the extent to which the product is cooked and its colour. The blanching condition 10 min-80° C. gives optimal results for substantially all potato samples as described in the examples of this patent. Results are included in the following table 4.

10 min-80° C.) on the quality of the coating and finish-frying was studied after a drying step of 3 minutes in air on the basis of drying in their own heat following the blanching step. French fry strips of the Carrera variety with a dry substance content of 16.1% were prepared in this experiment as specified above and subsequently dried on a stainless steel drip grid in air for 3 minutes, after which they were free of adhering water and dry in appearance.

The blanched french fry strips were subsequently coated with Clearcoat LC N6K2 V2 (P150305)—1 part powder/ 1.75 parts water (36.4% dry substance) with a formulation as specified in the present application on a Gaser coating line. The french fry strips were fully immersed twice in the coating suspension during the coating process, after which excess coating was blown off by means of a blow nozzle above the conveyor belt in the direction of the oil bath of the deep-frying unit. French fry strips were coated in these conditions with 14% coating (pick-up 14%) on weight basis. The deep-frying unit used to apply the coating was a Frymaster (H17, 17 kW, PH117 CSD) with a volume of 25

TABLE 4

The discoloration of french fry strips as a function of different time-temperature treatments measured as red discoloration of strips after the blanching treatment for 30 minutes exposure to air.

| | | temperature in ° C. | | | |
|---|---|---|---|---|---|
| variety | time (min) | 72 | 76 | 80 | 84 |
| Colomba | 5 | red discoloration | red discoloration | slight red discoloration | somewhat red discoloration |
| | 7.5 | red discoloration | slight red discoloration | somewhat red discoloration | no red discoloration |
| | 10 | slight red discoloration | somewhat red discoloration | No red | no red discoloration |
| Carrera | 5 | red discoloration | red discoloration | red discoloration | slight red discoloration |
| | 7.5 | red discoloration | red discoloration | slight red discoloration | somewhat red discoloration |
| | 10 | red discoloration | slight red discoloration | No red | no red discoloration |

Explanatory notes on colour descriptions used:
red discoloration: intense red colour forming on >30% of the strip surface area;
slightly red discoloration: red bloom on >30% of the strip surface area;
somewhat red discoloration: red bloom on about 10% of the strip surface area;
no red discoloration: surface free of red colour.

During the production process for low-calory french fries it is the object to produce french fries with a significantly lower calorific value on the basis of a lower dry substance content, and all process steps contribute toward realizing this objective. In the above described experiment the effect of blanching conditions around the optimum (10 min-76° C., l deep-frying oil. Coated strips of the whole batch drop from the conveyor belt within a period of 15 seconds into the oil bath of the deep fryer and are collected in a deep-frying mesh basket. In this example the coating was fried onto the french fry strips at an oil temperature of 160° C. for a period of 1.5 and 2 minutes. Immediately after the deep-frying step the coated french fry strips were frozen for 8 minutes to a temperature of −5° C. in a so-called chiller (Hobart blast chiller BCF21, 2350W). Following the blast freezing step the french fry strips were further stored in closed plastic bags in a freezer at −20° C. for a minimum of 1 day prior to further preparation steps. Finish-frying preferably takes place in hot air equipment with high air circulation as in an air fryer. The frozen coated french fry strips in this example were finish-fried in portions of 250 g in the air fryer at a temperature of 180° C. for a period of 7, 7.5 and 8 minutes. The effect of the various preparation steps in this example was assessed during the coating and finish-frying process on the basis of evolution of the dry substance content and the texture measured as breaking force during a three-point breaking test on the strips. Dry substance is a good relative indicator of the calorific value of the product. The breaking force of finish-fried strips as a measure of crispness of the crust of strips is measured in accordance with the standard TPA test of Stable Micro Systems (TXA texture analyzer) at a speed of 1 mm/s and a measurement period of 20 seconds. Fmax (in N) is the maximum force measured in the force-time curve. Fmax was measured on 10 strips per method and expressed as average. Fmax is a parameter for crispness and hardness of strips.

The influences of the different methods on the evolution of dry substance and texture of the coated, optionally finish-fried french fries are shown clearly in table 5.

The highest values were obtained in the combination 80° C. blanching, 1.5 or 2 minutes coating/pre-frying and 8 minutes finish-frying. The optimum combination of preparation steps is determined by a combination of quality characteristics as detected in the prepared french fry strips. The exterior of french fry strips according to the applied methods is golden yellow with light brown colour on the edges and outer ends of the strips and in accordance with USDA standards (<USDA scale 2).

It can be concluded in summary that method 16 in table 5 results in low-calorie french fry strips with the best balance between the desired characteristics. The crust of coated french fries of methods 1-16 is characterized by a grainy external structure and a lack of smoothness on the surface of the strips. It is expected that further improvements in the drying process in respect of drying time and drying temperature will result in a better adhesion and outflow of the coating during the frying process, and in smoother crusts.

TABLE 5

The expression of dry substance and texture characteristics of french fry strips under the influence of applied blanching, coating and finish-frying steps. Characteristics are shown per method and as averages as stated.

| Description | Treatment | | | DS % | ? DS % Rel. to raw | ? DS % Rel. to 0 | texture Fmax (N) |
| | Blanching 10 min at ° C. | Frying coating Minutes at 160 ° C. | Finish-frying Airfryer Minutes at 180 ° C. | | | | |
| --- | --- | --- | --- | --- | --- | --- | --- |
| Raw strips | | | | 16.1 | | | |
| Method 1 | 76 | 1.5 | 0 | 25.2 | 9.1 | | |
| Method 2 | 76 | 1.5 | 7 | 33.8 | 17.7 | 8.5 | 0.6 |
| Method 3 | 76 | 1.5 | 7.5 | 33.7 | 17.6 | 8.5 | 0.7 |
| Method 4 | 76 | 1.5 | 8 | 34.9 | 18.8 | 9.6 | 0.7 |
| Method 5 | 80 | 1.5 | 0 | 28.8 | 12.7 | | |
| Method 6 | 80 | 1.5 | 7 | 39.3 | 23.2 | 10.5 | 1.0 |
| Method 7 | 80 | 1.5 | 7.5 | 40.8 | 24.7 | 12.0 | 0.9 |
| Method 8 | 80 | 1.5 | 8 | 41.9 | 25.8 | 13.1 | 0.8 |
| Method 9 | 76 | 2 | 0 | 27.4 | 11.3 | | |
| Method 10 | 76 | 2 | 7 | 35.6 | 19.5 | 8.2 | 0.7 |
| Method 11 | 76 | 2 | 7.5 | 35.9 | 19.8 | 8.5 | 0.7 |
| Method 12 | 76 | 2 | 8 | 40.0 | 23.9 | 12.6 | 1.0 |
| Method 13 | 80 | 2 | 0 | 28.4 | 12.3 | | |
| Method 14 | 80 | 2 | 7 | 38.8 | 22.7 | 10.4 | 0.8 |
| Method 15 | 80 | 2 | 7.5 | 39.3 | 23.2 | 10.9 | 1.1 |
| Method 16 | 80 | 2 | 8 | 38.8 | 22.7 | 10.4 | 1.1 |
| Average | 76 | 1.5 | | 34.1 | 18.0 | 8.9 | 0.7 |
| Average | 76 | 2 | | 37.2 | 21.1 | 9.8 | 0.8 |
| Average | 80 | 1.5 | | 40.6 | 24.5 | 11.9 | 0.9 |
| Average | 80 | 2 | | 39.0 | 22.9 | 10.6 | 1.0 |
| Average | | | 0 | 27.5 | 11.4 | | |
| Average | | | 7 | 36.9 | 20.8 | 9.4 | 0.8 |
| Average | | | 7.5 | 37.4 | 21.3 | 10.0 | 0.9 |
| Average | | | 8 | 38.9 | 22.8 | 11.4 | 0.9 |

Described below is the further optimization of the drying process which must result in smooth, non-grainy crust structures of coated french fry strips. Coated french fry strips were produced from a batch of Colomba potatoes with a dry substance content of 13.2% as according to the above described method with a blanching treatment of 10 min-80° C. and subsequent drying with different drying times (3, 5, 7.5 and 10 minutes) at different temperatures (60, 70, 80° C.) in a drying oven (Termaks TS9430).

The coated french fry strip samples as according to the various described treatments were subsequently assessed for the quality of the coating in accordance with external characteristics with focus on degree of covering, adhesion to the strips, smoothness and roughness and for dry substance content as a measure of calorific value. The coat characteristics of french fry strips were scored by sight as indicated in the key of table 6. Optimally coated strips must combine a good coverage and adhesion with a smooth structure.

Adhesion and outflow of the coating during the frying process is a condition for obtaining smooth coatings. The smoothness of coatings is a function of drying time and drying temperature, with the best result in the combination of a drying time of 10 minutes and a drying temperature of about 80° C.

TABLE 6

Coat covering, coat adhesion and coat structure of french fry strips as a function of drying temperature and drying time prior to the coating process. Characteristics are scored visually according to the following scales: Coat covering as % covering of the strips, adhesion of the coat on a category scale from poor to very good, coat structure on a category scale from very rough to very smooth.

| Drying temperature ° C. | drying time minutes | coat covering area % covered | coat adhesion adhesion to surface | coat structure Smoothness coating |
|---|---|---|---|---|
| 60 | 3 | 65 | poor | very rough |
| 60 | 5 | 75 | poor-reasonable | rough |
| 60 | 7.5 | 80 | reasonable | rough |
| 60 | 10 | 85 | reasonable | rough |
| 70 | 3 | 70 | poor-reasonable | rough |
| 70 | 5 | 80 | reasonable | rough |
| 70 | 7.5 | 85 | reasonable | somewhat rough |
| 70 | 10 | 90 | reasonable-good | somewhat rough |
| 80 | 3 | 75 | poor-reasonable | rough |
| 80 | 5 | 85 | reasonable-good | somewhat rough |
| 80 | 7.5 | 98 | good | smooth |
| 80 | 10 | 100 | very good | very smooth |

The application of a drying step to optimize the coating process is a preferred step which could affect the dry substance and calorific value of the french fry strips following preparation. The dry substance percentage, DS %, of the strips varies in this case between 12.3-13.9% with the different temperature-time combinations prior to coating, and between 27.5-29.0 after coating. In summary, the experiment shows that the coating quality of french fry strips, from the perspective of coating and DS % (as marker for nutritional value), progresses optimally with a combination of 10 minutes-80° C. with a completely covering, properly adhering and smooth coating around french fry strips with a DS % of about 28% as outcome. It will be apparent that variations in these values are possible.

In a further experiment potatoes of the Evora variety were compared to potatoes of the Colomba variety. Results with conditions as discussed above show that Evora potatoes have a DS % of 15.4%. Colomba potatoes have a content of 13.2%. The obtained french fry samples displayed similar smoothness, adhesion and coverage for the applied coating as specified here with optimal coating quality at a drying time of 10 minutes at 80° C. for both varieties (data not shown).

Blanching, drying and coating in this experiment increased the DS % of the french fry strips from the range 13-15% DS in raw strips to a DS % in the range of 30-34% for coated french fries with optimal coverage, smoothness and adhesion. The increase in DS % in french fry strips as a result of the coating step was 15.3% in accordance with a computer model and was similar for both varieties, an indication that the applied coating functions similarly on raw french fry strips with differing initial values and has a measure of robustness for different potato batches irrespective of variety denomination or initial DS %. Samples of the french fry strips of the Colomba and Evora varieties with drying times of 3, 5 or 10 minutes were finish-fried in an air fryer for 7 or 8 minutes at 180° C. This resulted in a DS % in the range of 36.7-45.3, depending on the conditions applied.

In a further experiment the influence of blanching and coating parameters on the production process of low-calory french fries was further studied with focus on coating quality and related external characteristics. The drying time of blanched samples was set here at 10 minutes 80° C., suitable conditions as found from previous experiments. The processing steps of blanching time, blanching temperature, coating time and coating temperature were studied in combination with samples of the varieties Carrera (13.8% DS) and Colomba (12.3% DS) in a complete experimental design wherein the parameters were varied around the expected optima. The different treatment steps were performed as specified above in respect of preparation of samples, utilization of equipment, methods and scoring of quality characteristics.

The results show that a higher blanching temperature (80° C. vs. 76° C.) has a positive influence on the adhesion and smoothness of the coating for both varieties. This is in line with the above discussed results. A blanching step at 80° C. repeatedly gave the best coating results. A longer blanching time (10 min vs. 7.5 min) also brought about an improvement in coating quality, as found above. The blanching steps had a greater influence on the quality of the coating than on the evolution of the dry substance content. The influence on DS % was relatively small. The greatest influence on DS % and quality of the coating was exerted by the duration and temperature during the coating steps/pre-frying. The DS % as well as the adhesion and smoothness of the coating on the french fry strips increased with longer pre-frying time/coating duration (2 min vs. 1.5 min) and temperature of the oil during pre-frying/coating (170° C.>160° C.>150° C.). For the production of low-calory french fries DS % is however an important parameter which has to be optimized in the finish-fried product. In addition to a properly adhering and smooth coating, the mechanical strength and retention of a square strip form are moreover also good quality characteristics defining the quality of the coating process. Well-coated strips have a good square form along the length of the strips and retain this form during a rolling movement between the fingers. The inability to provide resistance to the rolling movement is an indication that the coating has been inadequately applied to the french fry strips. In the experiment the mechanical strength of french fry strips was scored in response to a rolling movement between the fingers for all preparation combinations. The measurement is performed between 1 and 2 minutes after application of the coating as an average impression of 10 strips per condition.

The results show that the mechanical strength of the coating of french fry strips increases in the same pattern as for the adhesion and smoothness of the french fry strips for both varieties. The strength is determined mainly by the combination of pre-frying time and pre-frying temperature, and to some extent by the blanching conditions.

In summary, the combination of 10 minutes blanching at 80° C., 2 minutes coating at 160° C. is the optimal combination resulting in a good, completely adhered, smooth coating with a good mechanical strength and a golden yellow colour and a DS % in the range of 25-29% around the optimal setting of the preparation parameters.

The production of low-calory french fries according to the invention requires suitable batches of potatoes which, after processing, actually produce coated french fries with the desired low nutritional value on the basis of a lower dry substance content and lower calorific value.

Described below is an experiment for assessing batches for suitability for the production of low-calory french fries with a quick test which accurately predicts the ability of potato batches to relinquish water during the production and preparation of low-calory french fries.

Samples of different batches of potatoes of the Evora, Colomba and Carrera varieties in the size range of 40-70 mm were washed, peeled and processed to a total of 5 kg of french fry strips of 10×10 mm in the above described manner.

The strip samples were then divided into two portions of respectively 2 and 3 kilograms for further experiments. On the one hand frozen coated french fry strips were prepared under optimal preparation conditions (10 minutes blanching at 80° C., 10 minutes drying at 80° C., 2 minutes pre-frying at 160° C. as specified above) and assessed for relevant quality characteristics. On the other hand the ability of french fry strips to relinquish water was studied during a frying process with an incremental time series from 0 to 3 minutes in a deep-fryer as used in previously described experiments. In this method 250 gram portions of french fries of the different samples were fried for a period of 0, 1, 2 and 3 minutes at a temperature of 180° C., removed from the oil at the given times, shaken to remove adhering oil and measured for dry substance content after drying for 48 hours at 80° C. in a drying oven (Termaks TS9430). Evolution of dry substance content as a function of frying time was calculated with linear regression with the directional coefficient of the curve as measure of water loss.

The results of the measurements show that the dry substance content of the raw french fries as used in the experiments varies between 13.2 and 18% dry substance over the different batches, varieties used and origins. After pre-frying the content varies between 29.1 and 34.2%, a range similar to the above described measurements after preparation under similar conditions. The dry substance evolution of french fry strips as a function of frying time (rc fry curve) is to a great extent related to the dry substance content of coated french fries and is a good parameter for the prediction of the dry substance content of coated french fries after the preparation process. There is no significant relation between the initial dry substance content of raw strips of the batches and the dry substance content of coated strips, this indicating that the dry substance evolution of strips during the frying process is not associated with this characteristic but, perhaps, with the quality and quantity of the cell walls of the batches in question. Batches of potatoes of the studied samples of three varieties in this experiment differ in the ability to relinquish water during a frying process. This is a good parameter for the prediction of the dry substance content of coated low-calory french fry strips in an optimal preparation process as measured on the basis of dry substance content. It has been found more specifically that, in the assessment of a batch for suitability, use can be made of a determination of the relation between dry substance content and frying time. A value for the directional coefficient of the curve in the range of 4-6 with as unit the percentage of dry substance per minute of frying time at a temperature of 180° C. has been found suitable here for the purpose of assessing whether a batch is suitable for processing.

The specified relation between the evolution of dry substance during a drying process and the dry substance content of coated french fries following application of an optimal production process is possibly also relevant during the finish-frying process of french fries in preparation for consumption of low-calory french fries according to our invention. This relation has been further studied in further experiments in relation to the dry substance content of french fries finish-fried in the air fryer.

Coated french fries were made from potato batches of the Carrera, Colomba and Evora varieties as described above. Coated frozen french fries were finish-fried in portions of 250 g with the air fryer for a period of 80 minutes at 180° C., as specified above, and subsequently cooled rapidly to −5° C., after which the dry substance content was measured as described in the previous experiment.

The dry substance content of coated french fry strips varied between 29.1 and 34.2% for the different batches and varieties. The dry substance content of finish-fried french fries was between 38.7 and 45.4%. The dry substance content of finish-fried french fries correlated to a great extent with the dry substance evolution of french fry strips as a function of frying time, and dry substance coated french fries. These relations show that the extent to which french fry strips evolve dry substance in the preparation process is not particularly different in the individual steps of the process, but applies generally during all steps of the process. The dry substance evolution of french fry strips as a function of frying time thus has a predictive value for the dry substance content of coated french fries, but also for that of finish-fried french fries. Dry substance evolution, or water loss, is apparently a batch-related behaviour which progresses proportionally to the dry substance evolution of french fry strips as a function of frying time as determined from the above described experiments.

Low-calory coated french fries according to the invention must not only comply with nutritional value specifications but also with specific texture criteria. Coated french fries of the varieties and batches as prepared and finish-fried in above described experiments were measured for texture characteristics with the standard TPA test of Stable Micro Systems. In addition to crispness (measured as breaking force Fmax in N), the flexure distance (in millimetres) until the Fmax value is reached, expressed as Extn, was also examined. This describes the breakability of french fry strips.

Fmax varies between 1.2 and 2.1 N, which on a sensory scale corresponds to between crispy and crunchy (own observations, no data). Extn varies from 2.1 to 4.3 mm, which is associated with easily breakable to quite flexible. Fmax and Extn are inversely proportional/reciprocal characteristics, which is understood to mean that if the one characteristic increases, the other decreases. There are significant relations between the dry substance characteristics and the texture characteristics. Both crispness and breakability increase at higher values of the dry substance characteristics. The relations found are in line with the empirical fact that crispness and breakability of finish-fried products are a function of water content.

Low-calory coated french fries with a cut size of 10×10 mm, which after finish-frying following preparation as described above have a dry substance content in the range of 38-43%, a crispness in the range 1.5-2.5 N and a breakability measured as the characteristic Extn of <3.3 mm, comply with the optimum profile according to the invention.

Low-calory coated french fries as obtained from the experiments show a surprising combination of properties. As finish-fried end product the french fries combine a conventional golden yellow colour with clear crispness of the crust, an exceptionally low dry substance content and a low calorific value based on a moist soft filling.

It will be apparent that the above discussed experiments show examples and suitable ranges of conditions and/or compositions. Some variation is possible.

Coated french fries according to the invention have a significantly lower calorific value compared to regular french fries as prepared in a frying process in oil. The calorific value and nutritional value of coated french fries of the invention was measured from a series of samples of the varieties Carrera, Colomba, Evora and Innovator. Coated french fries of cut size 10×10 mm and 12×12 mm were produced according to the above described procedure. The calorific and nutritional value of the coated french fry samples of the above varieties were compared after a finish-frying step in the air fryer (8 minutes at 180° C. as according to above) to those of two batches of regular 10×10 mm french fries of the Innovator variety finish-fried in oil in a frying process of 3 minutes at 180° C. Both regular Innovator samples were produced in identical manner as described above, with the exception of the coating step where the blanched and dried strips were only pre-fried in oil in the absence of the coating but with the same time duration and frying temperature as during the coating process. French fries of the different samples were frozen in a Hobart blast chiller to −5° C. immediately following deep-frying and subsequently to −20° C. in the freezer prior to analysis in order to avoid drying-out and loss of moisture. Samples were stored in hermetically sealed plastic bags prior to further measurements. Nutritional value and calorific values of samples were measured for the characteristics such as available carbohydrates, total carbohydrates, energy value (kCal), energy value (kJ), fat, protein, moisture content and dietary fibre (in accordance with AOAC).

Coated french fries according to the invention typically have an energy value between 170 and 190 kCal/100 g at a cut size of 10×10 mm and an energy value between 160 and 180 kCal/100 g at a cut size of 12×12 mm, depending on the dry substance content of pre-fried coated french fries. It emerges here that 12×12 mm french fries of the invention have an additional decrease in energy value relative to 10×10 mm french fries. The influence of cut size of energy value of french fries is also known for regular french fries, although the coated french fries of the invention have an extra reduction.

When coated french fries of the invention finish-fried with an air fryer are compared to regular french fries finish-fried in oil, there is a much greater reduction in energy value. There is then an average reduction of 30% for the cut size 10×10 mm and as much as 33% for 12×12 mm french fries. With a correct choice of batch of low-calory varieties reductions in energy value are possible of up to over 40% for coated french fries according to the invention. This reduction in energy value is based on an average reduction of about 23% in available carbohydrates and a reduction of about 40% in fat content compared to regular french fries finish-fried in oil. The coating of the reference variety Innovator with the coating of the invention results in a reduction of about 10% or 18% in energy value in accordance with respective cut sizes of 10×10 mm and 12×12 mm, this being substantially due to a reduction in the fat content and a slight increase in the moisture content. The reduction obtained is however much lower than in coated french fries of the invention with the preferred varieties. Typical fat contents of coated french fries of the invention finish-fried with an air fryer vary between 7.0 and 8.0% for the 10×10 mm cut size and between 6.0 and 7.0% for the 12×12 mm cut size. Finished-fried coated french fries of the invention typically have a moisture content between 60 and 65%, this being more than a quarter more than in regular french fries finish-fried in oil (with 49.2% moisture).

The effect of the coating according to the invention on the fry colour has been researched. Fry colour of french fries occurs as a result of Maillard reactions between the reducing sugars glucose and fructose with amino acids, of which asparagine makes the largest contribution, particularly during a frying process in oil. Brown discoloration is largely a function of the concentration of the reducing sugars, amino acids, water content of the product and finish-frying temperature. Regular french fry varieties must have a low content of reducing sugars in order to prevent too brown a colour developing during the finish-frying process (USDA colour=/>3). The aim in practice is a reducing sugar content below the limit of 50-60 mg glucose & fructose/100 g in order to realize this objective. Using process technology the industry can still process potatoes with a higher sugar content than the stated norm, for instance by applying blanching and drying steps, the use of coatings, but encounters insurmountable problems with the colour of finish-fried french fries when the sum of glucose and fructose becomes higher than about 200 mg/100 g. The Carrera, Colomba, Evora varieties are distinguished by very high contents of reducing sugars, this being characteristic for varieties with a low dry substance content. Production of regular, non-coated french fries from these varieties results without exception in dark brown french fries with maximum scores on the USDA colour chart, and such french fries are unsuitable for professional applications. Innovator has the desired sugar profile for commercial professional french fry production, although there are also varieties with 50% fewer reducing sugars which perform optimally as such in respect of french fry colour. The production of coated french fries from the Carrera, Colomba and Evora varieties with the coating of the invention according to the optimal preparation method as described in previous examples results in an average fry index between 2.5 and 4.0 with a normal distribution of USDA scores for individual french fry strips between 0 and 3. Colour of finish-fried french fries was measured with a DigiEye system (Verivide) under D65 light. Twenty french fry strips per sample were laid out on a tray and photographed under D65 illumination, after which the recordings were converted to Lab.tiff files and subsequently assessed for colour with an algorithm which converted the L.a.b. values of individual french fry strips pixel-wise to USDA scores as according to the USDA colour chart classification. The average fry colour of samples on the basis of variety, cut size and coating type as measured on the USDA scale (0-4) was between 3.1 and 3.9 for the samples on the fry colour/fry index scale. This follows from ((n1

(USDA0)×2)+(n2 (USDA1)×3)+(n3 (USDA 2)×4)+(n4 (USDA 3)×5)+(n5 (USDA 4)×6))/(n1+n2+n3+n4+n5). The colour distribution on the USDA scales largely shows values on the USDA scale 1 and 2, with low numbers on scales 0, 3 and 4. The coating of the invention has the ability to prevent the development of brown colour in coated french fries prepared from batches with a reducing sugar content in the range of 200 to 1200 mg glucose and fructose/100 g and to reduce it to a level found in regular commercial french fries.

Also occurring in parallel with the development of brown colour during the process of frying french fries is a highly undesirable byproduct with possible harmful effects to health: acrylamide. Acrylamide contents of the uncoated french fries rise to contents of an average of 3000 µg/kg with peak values above 4000 mg/kg. By contrast coated french fries with the coating of the invention have exceptionally low acrylamide contents in the 30-200 µg/kg range. The coating of the invention in combination with an air fry finish-frying step results in exceptionally low acrylamide contents.

The possibility of further reducing the fat content was studied in a further experiment with coated (pre-fried) french fry samples of the varieties Carrera (low-calory) and Innovator (reference) with a cut size of 10×10 mm which are prepared according to the above described optimal process and, immediately after the coating process in the oil at 160° C., had adhering oil removed using a hand-driven vegetable centrifuge with a diameter of 26 cm preheated to 60° C. The portion of french fries was centrifuged uniformly for a period of 30 seconds, then frozen as described above and stored in hermetically sealed bags prior to nutritional value analysis with the focus on fat content. Non-centrifuged french fry samples were included for comparison to the centrifuging treatment. The effect of centrifuging on coated pre-fried french fries and coated pre-fried centrifuged french fries was studied following a finish-frying process (Philips "Air fryer", 8 minutes 180° C.). There was a decrease in the relative fat content of the french fry samples under the influence of the centrifuging. The effect did not depend on variety (ANOVA, not significant) but was significant (ANOVA, p<0.05) in the case of pre-fried coated french fries. The difference remained significant after finish-frying, although the difference did decrease after finish-frying. Pre-fried coated french fries of the invention had about 15% less fat after the centrifuge step. After finish-frying the difference amounted to 6%. This corresponds in this experiment to a decrease of 10 kCal/100 g energy value in pre-fried french fries and about 5 kCal/100 g in finish-fried product. The example shows that the fat content of coated french fries of the invention can be further reduced with specific fat-reducing measures to an energy value between 140 and 160 kCal/100 g, depending on the cut size of the french fries and the efficiency of the fat-reducing measures.

Finish-fried coated french fries of the invention have a crisp texture and low calorific value which must preferably be maintained for a specific holding time. It is usual in practice to keep prepared french fries warm during the holding time under IR heating lamps. A practical standard for shelf-life of finish-fried french fries is the ability to preserve the texture for a period of 5 minutes. Obtained results show that finish-fried coated french fries of the invention can preserve the desired crispy texture for a period of 5 minutes under heating lamps. The results also show that the use of 37% m/m batter suffices for the production of crisp coated french fries of the invention with a shelf life of 5 minutes under IR heating lamps. The energy value and related characteristics of the samples did not change significantly as a function of storage time in the studied period of 5 minutes.

In a further experiment the method with the coating according to the invention was compared to that of a coating according to patent document WO 00/28828 for the relevant product characteristics as measured and assessed in the previous examples. For this purpose coated french fries were made from a total of 14 batches of potatoes of the Evora, Carrera, Colomba and Innovator varieties with the coating of the invention and the Simplot coating as specified in said patent document under identical batter and pick-up conditions as in the method of the invention.

The coating was used for a part of the batches on french fries with a cut size of 10×10 mm and for the rest of the batches on a cut size of 12×12 mm so as to be able to study the influence of cut size on the quality of the two coatings and the expression of quality characteristics in the prepared coated french fries. The preparation of the coated french fries was performed as specified in previous examples on the basis of a blanching step of 10 minutes at 80° C., a drying step of 10 minutes at 80° C., a coating of 2 minutes at 160° C. and a blast freezing step of 8 minutes at −5° C., and the samples were finally further deep-frozen to −20° C. in a cold store. This combination of preparation steps resulted in coated french fries with optimal external quality for both coatings and a uniform coating with good adhesion as specified above.

The results show that at the level of coated frozen french fries the Simplot coating has a lower dry substance content, and so comprises more water, compared to the coating according to the invention. The dry substance content is an average of 11.1% lower for the cut size of 10 mm and 7.6% lower for the cut size of 12 mm. The difference between the Simplot coating and the coating of the invention decreases with increasing cut size in line with the absolute dry substance content of the samples (DS coating invention vs. Simplot coating for 10 mm cut size: 31.1%:27.5%; DS coating invention vs. Simplot coating for 12 mm cut size: 28.6%:26.4%). The difference in dry substance content between the two coatings can be attributed to the quality of the two coatings in the sense of adhesion, thickness and composition. The Simplot coating is typified by a very smooth exterior and a very thin but dense and closed coating, this in contrast to the coating of the invention which is typified by a thicker, likewise smooth coating with a certain airy structure. The dense closed Simplot coating retains significantly more water during the coating process for both applied cut sizes. The frozen coated french fry samples were subsequently finish-fried in the air fryer during a preparation step of 8 minutes at 180° C. and assessed for fry colour. Overall there were small, though significant differences in colour as a result of variety, cut size and choice of coating in a colour range which was acceptable in the whole range in accordance with practical standards. The coating of the invention produced coated french fries which, after finish-frying in the air fryer, had a good colour in accordance with USDA norms.

Texture was measured for both coatings with the above discussed instrument measurements for the texture characteristics Fmax (N) and extension (millimetres) of the coated french fry batches on the basis of the two coatings for the cut sizes 10×10 mm and 12×12 mm. In addition to instrument measurements, a sensory assessment of the finish-fried french fry samples was made by a panel for crispness with a scale of 1 (not crunchy) to 9 (very crunchy). Results are included in the following table 7.

TABLE 7 comparison of coatings

| variety/sample | cut size | coating | Extension (mm) | Fmax. (N) | crunchy (1-9) | variety/sample | cut size | coating | Extension (mm) | Fmax. (N) | Crunchy (1-9) |
|---|---|---|---|---|---|---|---|---|---|---|---|
| Carrera 12 | 10 × 10 | Simplot | 5.4 | 1.0 | 1 | Carrera 13 | 12 × 12 | Simplot | 4.4 | 1.5 | 1 |
| Colomba 2 | 10 × 10 | Simplot | 4.5 | 0.9 | 3 | Carrera 14 | 12 × 12 | Simplot | 4.4 | 1.7 | 2 |
| Colomba 4 | 10 × 10 | Simplot | 5.1 | 0.8 | 2 | Carrera 3 | 12 × 12 | Simplot | 4.3 | 1.5 | 1 |
| Innovator 23 | 10 × 10 | Simplot | 2.2 | 2.3 | 5 | Carrera 9 | 12 × 12 | Simplot | 4.8 | 1.6 | 2 |
| Innovator 27 | 10 × 10 | Simplot | 1.5 | 2.9 | 5 | Colomba 8 | 12 × 12 | Simplot | 3.5 | 1.8 | 1 |
| Carrera 12 | 10 × 10 | Standard | 5.9 | 0.7 | 7 | Innovator 25 | 12 × 12 | Simplot | 2.8 | 3.3 | 4 |
| Colomba 4 | 10 × 10 | Standard | 5.7 | 0.8 | 7 | Carrera 13 | 12 × 12 | Standard | 6.2 | 1.9 | 8 |
| Evora 10 | 10 × 10 | Standard | 5.3 | 1.2 | 8 | Carrera 14 | 12 × 12 | Standard | 6.9 | 1.6 | 7 |
| Evora 6 | 10 × 10 | Standard | 5.8 | 1.3 | 8 | Carrera 3 | 12 × 12 | Standard | 6.6 | 1.3 | 8 |
| Innovator 23 | 10 × 10 | Standard | 4.9 | 2.0 | 8 | Colomba 5 | 12 × 12 | Standard | 5.6 | 1.0 | 8 |
| Innovator 27 | 10 × 10 | Standard | 4.4 | 2.4 | 9 | Colomba 8 | 12 × 12 | Standard | 6.1 | 2.1 | 9 |
| | | | | | | Innovator 25 | 12 × 12 | Standard | 5.0 | 3.0 | 9 |
| average | 10 × 10 | Standard | 5.3 | 1.4 | 7.8 | average | 12 × 12 | Standard | 6.1 | 1.8 | 8.2 |
| average | 10 × 10 | Simplot | 3.8 | 1.6 | 3.2 | average | 12 × 12 | Simplot | 4.0 | 1.9 | 1.8 |
| ANOVA | | | $p < 0.05$ | ns | $p < 0.05$ | ANOVA | | | $p < 0.05$ | ns | $p < 0.05$ |

The results show that the characteristic of extension, the distance covered until french fry strips break in a breaking test, is significantly higher for french fries with the coating of the invention. The strips coated according to the invention provide longer resistance to breakage during the breaking test than the strips with the Simplot coating. The differences in breaking speed are in line with the sensory crispness of the samples. The french fry strips with a Simplot coating are not crisp, have a thin and tough structure of the coating and french fry strips on the basis of this coating provide a soft, moist sensation as also detected for soft regular french fries which cannot be finish-fried crisply (so-called limps). The french fry strips with a Simplot coating are therefore not suitable for consumption. The french fry strips of the invention have a crisp structure, in respect of texture sensation as well as in terms of sound during the chewing process. The strips combine a crispy crust with a soft moist filling. There are relatively small differences in detected texture characteristics in the two different cut sizes. For the coating of the invention 10×10 mm and 12×12 mm are of substantially similar crispness. In the Simplot coating the crispness of 12×12 mm strips is even softer and more moist than of the 10×10 mm strips. This demonstrates the better structure of the product with the coating according to the invention. The coating of the invention and the Simplot coating contrast in water-retaining capacity (Simplot >>coating of the invention), structure of the coating (Simplot: tough and thin; coating of the invention: airy and thicker), texture of the coating (Simplot: tough, not crisp; coating of the invention: crisp and firm).

The present invention is by no means limited to the above described preferred embodiments thereof. The rights sought are defined by the following claims, within the scope of which many modifications can be envisaged.

The method has thus been found highly suitable for the preparation of french fries in diverse cut forms and other products where potato granulate or starch are applied in heating processes. It will be apparent that the same method can also be suitable for preparing other products for finish-frying with an origin other than potatoes, for instance originating from corn, rice, grain and the like. Similar advantages are hereby achieved as described in the present application with reference to potato products.

The invention claimed is:

1. A method for preparing a potato product for finish-frying, comprising the steps of:

supplying a quantity of potatoes of a potato variety with an underwater weight equal to or lower than 300 g/5 kg;
washing, peeling and cutting the supplied potatoes to form a basic potato product;
blanching the basic potato product to form a blanched potato product;
drying the blanched potato product;
applying a coating to the blanched and dried potato product to form a coated potato product; and
pre-frying the coated potato product to form a pre-fried potato product,
wherein the steps provide a potato product having a dry substance percentage after coating and pre-frying and before finish-frying in the range of 29.1-34.2%, and wherein the energetic value is in the range of 100-120 kCal/100 g after coating and pre-frying and before finish-frying, wherein the coating composition is provided with a composition comprising by weight relative to the weight of the composition:
30-60% modified starch comprising high amylose starch;
20-30% flour;
5-20% dextrin;
2-10% unmodified starch; and
0.01-2% carbonate.

2. The method as claimed in claim 1, further comprising the step of finish-frying the pre-fried potato product, wherein the energetic value of the finish-fried potato product is lower than 190 kCal/100 g and the dry substance percentage is in the range of 38.7-45.4%.

3. The method as claimed in claim 1, wherein the content of available carbohydrate in the finish-fried potato product is lower than 29% by weight.

4. The method as claimed in claim 1, wherein the acrylamide content in the finish-fried potato product is lower than 120 μg/kg.

5. The method as claimed in claim 1, wherein the blanching time lies in the range of 8 to 12 minutes.

6. The method as claimed in claim 5, wherein the blanching temperature lies in the range of 74 to 84° C.

7. The method as claimed in claim 1, wherein the temperature amounts to about 160° C. during application of the coating which is applied within a time interval in the range of 1.5 to 2.5 minutes.

8. The method as claimed in claim 1, wherein the finish-frying time lies in the range of 6 to 9 minutes.

9. The method as claimed in claim 1, wherein the modified starch comprises 10-25% chemically acetylated starch of the content of modified starch.

10. The method as claimed in claim 1, further comprising the step of modifying the coating composition on the basis of the origin of the potato product, storage life and/or storage conditions.

11. The method as claimed in claim 1, wherein the pre-fried potato product is deep-frozen prior to the finish-frying.

12. The method as claimed in claim 1, wherein the finish-frying is performed with hot air in an air fryer.

13. The method as claimed in claim 1, wherein an end product is realized provided with a texture with a breaking value in the range of 1.5 to 3 N.

14. The method as claimed in claim 1, further comprising the step of selecting a batch, the step of selecting a batch comprising determining the dry substance content for a batch as a function of frying time.

15. The method as claimed in claim 14, wherein a batch is assessed as suitable if the directional coefficient for the relation between dry substance content and frying time lies in the range of 4-6% dry substance per minute of frying time at a frying temperature of 180° C.

16. The method as claimed in claim 1, wherein the coating is applied with a suspension provided with a dry substance content in the range of 30-55%.

17. A processing line configured to perform the method as claimed in claim 1.

18. Application of the method as claimed in claim 1, resulting in a potato product provided with a:
   calorific value lower than 190 kCal/100 g;
   content of available carbohydrates of 20-24%;
   acrylamide lower than 100 μg/kg;
   colour in accordance with USDA≤3;
   fat content in the range of 5-7%;
   texture 1.5-2.5 Newton; and
   shelf life of 5 minutes in holding time period at about 60° C. under a heating lamp.

* * * * *